United States Patent [19]

Grable

[11] Patent Number: 4,637,462
[45] Date of Patent: Jan. 20, 1987

[54] LIQUID MUD RING CONTROL OF UNDERGROUND LIQUIDS

[76] Inventor: Donovan B. Grable, #17 Seasons Ct., Madera, Calif. 93637

[21] Appl. No.: 740,986

[22] Filed: Jun. 4, 1985

[51] Int. Cl.⁴ .................. E21B 33/138; E21B 43/30; E21B 47/00; E02D 3/12
[52] U.S. Cl. .................................. 166/245; 166/254; 166/292; 405/129; 405/270; 210/170
[58] Field of Search ............. 166/292, 293, 294, 295, 166/245, 254, 285, 305.1; 299/7, 8; 175/66; 405/128, 129, 267, 270; 210/170

[56] References Cited

U.S. PATENT DOCUMENTS

| 2,161,800 | 6/1939 | Cross | 299/7 X |
|---|---|---|---|
| 3,407,605 | 10/1968 | Coffer et al. | 405/267 X |
| 3,761,132 | 11/1973 | Grable | 299/7 |
| 3,790,213 | 2/1974 | Grable | 299/8 |
| 3,855,807 | 12/1974 | Grable | |
| 3,856,355 | 12/1974 | Grable | 299/8 |
| 3,917,326 | 11/1975 | Grable | 299/8 |
| 4,255,067 | 3/1981 | Wright | 405/128 X |
| 4,273,475 | 6/1981 | Fuller | 405/267 X |
| 4,288,174 | 9/1981 | Laws | 405/129 X |
| 4,305,463 | 12/1981 | Zakiewicz | 166/245 |
| 4,311,340 | 1/1982 | Lyons et al. | 405/267 X |
| 4,399,866 | 8/1983 | Dearth | 166/292 X |
| 4,430,021 | 2/1984 | Wagner et al. | 405/129 |
| 4,439,062 | 3/1984 | Kingsbury | 405/129 |
| 4,497,519 | 2/1985 | Grable | 299/8 |
| 4,541,927 | 9/1985 | Breidenbaugh | 210/170 X |

Primary Examiner—George A. Suchfield
Attorney, Agent, or Firm—William W. Haefliger

[57] ABSTRACT

A method of controlling subterranean flow of contaminants draining from a zone of contaminant concentration, includes
 (a) determining the locus of flow of contaminants in a porous underground formation, and
 (b) injecting into the formation a substance that creates a barrier in the formation to said flow, to thereby block said flow.

20 Claims, 2 Drawing Figures

4,637,462

LIQUID MUD RING CONTROL OF UNDERGROUND LIQUIDS

BACKGROUND OF THE INVENTION

This invention relates generally to control of contaminants in water, and more particularly to such control as applied to contaminants in reservoirs or ponds, thereby to prevent, reduce or control contamination of the underground formation. The risk of contamination of fresh underground water or aquifers is thereby reduced or substantially eliminated.

Need for such control of contamination is known, Federal Government agencies, such as the EPA, providing programs addressed to alleviating such contamination. Recently the problem of selenium contamination of water drainage from the Kesterson Reservoir in the San Joaquin Valley has been addressed by the U.S. Department of the Interior, and the California State Water Resources Board. Proposals to alleviate such contamination have resulted in clean-up programs estimated to cost hundreds of million of dollars. Clearly, there is need for method and means to alleviate such problem, at much lower cost.

SUMMARY OF THE INVENTION

It is a major object of the invention to meet the above need, through method and means that do not require removal and re-siting of vast quantities of earth. Basically, the method of the invention contemplates controlling the flow of downwardly seeping and laterally seeping contamination by:

(a) determining the locus of flow of the contaminants in a porous underground formation, and
(b) injecting into the formation a substance that creates a barrier in the formation, to such flow, to thereby block said flow.

The above first step is typically carried out by testing the composition of the formation in a region or regions toward which contaminant flow is suspected; and test holes are typically drilled proximate the reservoir or pond to enable such testing.

The above second, or injection, step typically includes drilling at least one hole in the formation, said (b) step injection being carried out via said hole or holes. To this end, the injection step may also include setting casing in the drilled hole, cementing the casing in place, said (b) step injecting including pumping said substance in flowable form and under pressure downwardly in the casing to a depth at which it penetrates the underground formation.

Further, the injected substance typically includes an expansible clay-like material or equivalent thereof, that enters and tends to plug flow passages in the formation.

Further steps of the invention include maintaining a settling pond or reservoir, and periodically removing the said settled solids from the pond bottom, and storing the removed solids, whereby the concentration of contaminates draining from the pond is correspondingly reduced. Such removed solids may be processed to extract mineral or salt concentrates, including selenium, for disposal or use in industry. Dredges may be operated in the reservoir or pond to remove the deposit layer at the bottom of the pond.

These and other objects and advantages of the invention, as well as the details of an illustrative embodiment, will be more fully understood from the following specification and drawings in which:

DRAWING DESCRIPTION

FIG. 1 is an elevation, in section, showing a settling pond from which contaminated water slowly drains, and associated apparatus employed in accordance with the invention; and FIG. 2 is a plan view showing the FIG. 1 pond, test wells, and barrier injection wells.

DETAILED DESCRIPTION

Figure 1:
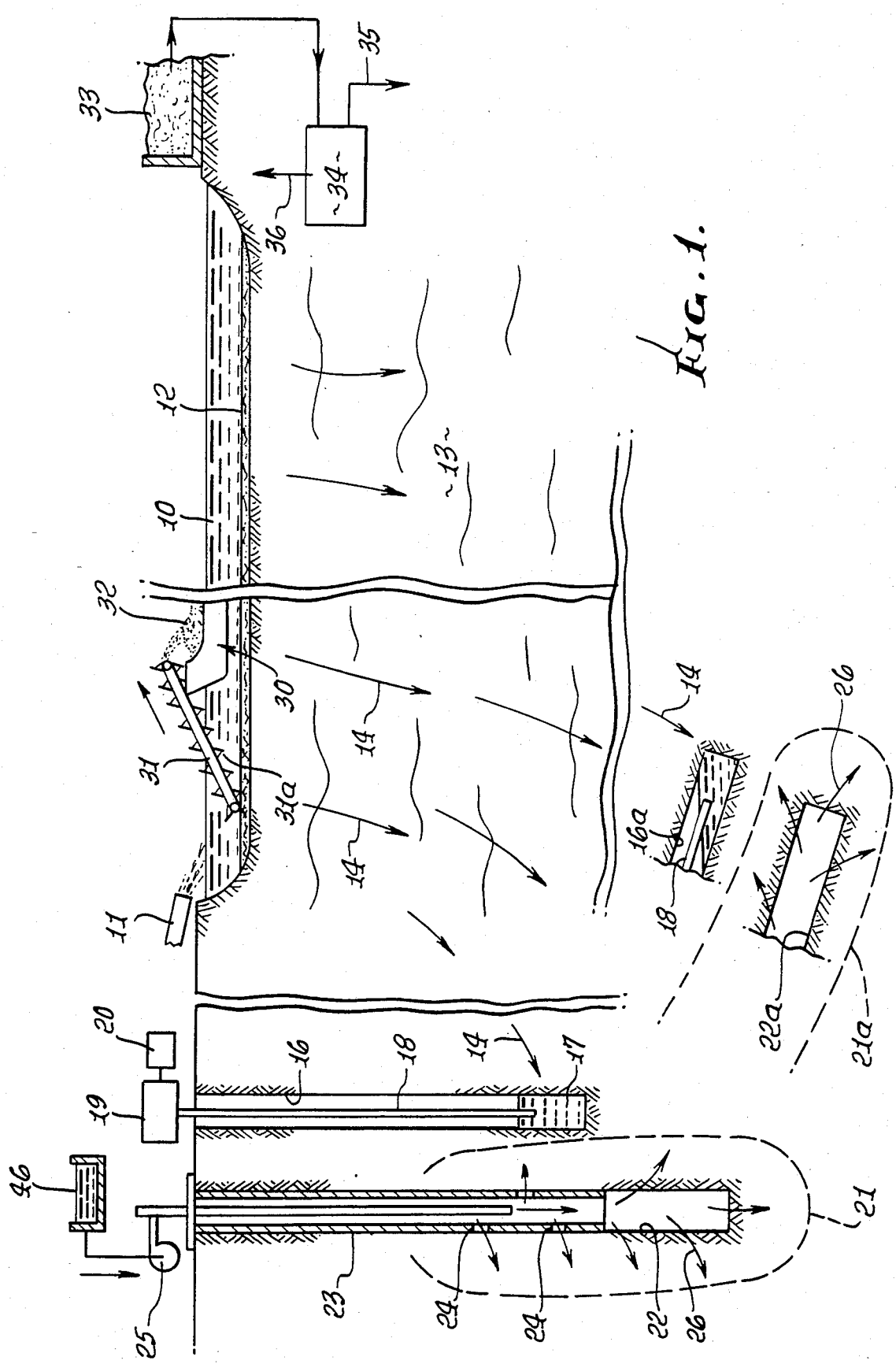

In the drawings, a settling pond or reservoir is indicated at 10, and typically may have a water depth of up to several feet, 2 to 30 for example. The area or size of the pond may vary within wide limits, i.e. several hundred square feet to square miles. Water may be fed to the pond as indicated at 11, and may for example consist of drainage water, from irrigated areas, silt carrying water from streams or rivers, flood run-off, etc. Such water may, for example carry or contain contaminants such as selenium, arsenic, boron, cadmium, chromium, copper, mercury, molybdenum, nickel, silver and zinc, or salts thereof, in parts per million in excess of acceptable limits. During settling, the solids in the pond or reservoir water, including such contaminants, tend to settle, and form a bottom layer or layers, indicated at 12. Over time, water and contaminants therein may seep or drain downwardly in the formation 13, as indicated by the arrows 14, and it is desirable that lateral travel of the drainage be contained. It is also desirable that the concentration of contaminants in the draining water be minimized.

In accordance with the invention, the locus or loci of flow of the draining contaminants, in the porous underground formation is first determined. Thereafter, or in conjunction with such determination, the invention contemplates the injection into the underground formation of a substance or substances that create a barrier in the formation to such flow, to block, or slow the lateral or downward spreading of contaminant seepage, whereby the purity of fresh ground water in the vicinity of the reservoir is not impaired, i.e. is preserved, or the amount of fresh water contamination is reduced. In this regard, need for highly expensive dig-up and removal of the formation below or near the reservoir is thereby avoided.

Figure 2:
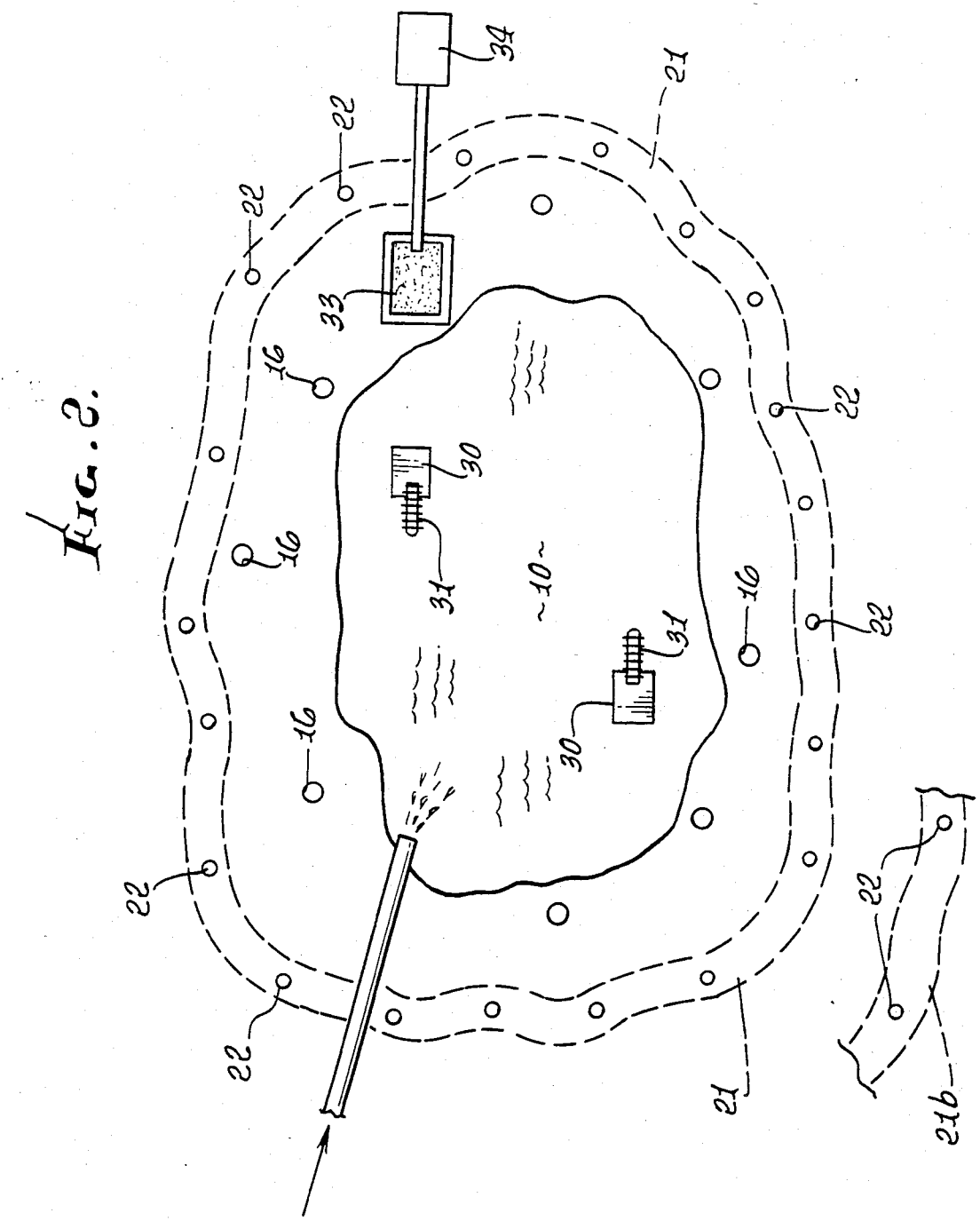

More specifically, FIGS. 1 and 2 show the provision of test wells 16 drilled downwardly into the formation in regions about the reservoir, and typically laterally thereof; see also test wells 16a drilled at slant depth below the reservoir. Water seeping into the test wells, as seen at 17, is periodically tested to determine contamination levels. See for example piping 18 extending in the test wells, and, via which water is withdrawn via pump 19, and delivered testing instrumentation 20, the latter being conventional. If the contamination level is rising or is otherwise considered dangerous, or of future concern, the need for a barrier to block seepage flow in the formation at the test locality is considered established. The depth of the test wells 16 may vary, examples being 13 to 100 feet.

To create the barrier, or barriers indicated for example by broken lines 21 and 21a, one or more injection wells are drilled, as indicated at 22, as for example laterally outwardly from the test wells. FIG. 1 also shows a slant injection well 22a below the level of test well 16a, and below the reservoir. Such injection wells 22 and 22a may then be partly or completely cased at 23, and cemented, as is done in oil and gas well completion, in order to withstand injection pressures, i.e. not damage the well formation. Casing perforation, by known techniques may also be carried out. See perforations 24.

Thereafter, a subterranean barrier creating substance is pumped down the wells 22, as via a pump 25. A source of such flowable aqueous liquid slurry, or mud, is indicated at 46, and may consist of drilling mud as is used in the oil and gas drilling industry. They mud typically contains particles of clay that are characterized as expansible after they forcibly enter (see arrows 26) subterranean passages or porosity, under pressure, to plug same, creating the barrier or barriers 21 to flow of the reservoir seepage. Such clays are generally referred to as "Bentonites", which are colloidal calys (aluminum and magnesium silicates) containing montmorillonite. They are of varying compositions and are obtainable from natrual deposits in many countries, including Italy, Spain, U.S.S.R., Canada and the United States (principally Wyoming, Mississippi and Texas). Although some bentonites, principally those which may be characterized as calcium (or magnesium) bentonites, have low or neglible swelling capacities, these may be converted or "activated" so as to increase such swelling capacity. Such conversion may be effected by appropriate treatment with alkaline material, preferably aqueous sodium carbonate solution, in a manner known in the art, to insert sodium (or potassium) into the clay structure.

Accordingly, the created barriers 21 and 21a obstruct or contain the seepage from the reservoir, FIG. 2, showing a barrier extending as a ring around the formation below the reservoir 10. Such barrier or barriers may have any desired depth, as controlled by depth of the wells 22—example being 10 to 150 feet. A second and outer barrier is also shown at 21b in FIG. 2, and may extend around barrier 21.

The risk of contamination (as by selenium or other metals or salts) is further reduced, by reducing the concentration of contaminants in the water seeping from the reservoir. To this end, the deposit or layer 12 of concentrated minerals and salts thereof is periodically removed, as for example by operating a floating, self propelled dredge or dredges in the pond or reservoir. See for example dredges 30 with endless conveyors 31 having buckets 31a that are traveled downwardly to progressively scoop up layer 12, as the dredge is moved, or moves, about the pond. The removed concentrate 32 is shown as temporarily stored at 33. It may be subsequently processed, as at 34, to separate and recover the mineral concentrates at 35, the lighter fractions such as silicates being removed at 36 for return to the land. Cyclone or other separation means may be employed.

A stable reservoir system may thus be established, with water evaporating from the reservoir; settled contaminant concentration being removed; and any seepage from the reservoir being located and blocked or contained.

The cost of drilling wells, injecting the barrier forming mud, and dredging the controllable size reservoir is very much less than the alternative of digging up the reservoir and disposing of the contaminated earth, for large size reservoirs.

A usable, legged, floatable hull dredge is disclosed in U.S. Pat. No. 3,855,807 to Grable, incorporated herein by reference.

Usable barrier mud densities (weights) can vary from less than about 100 pounds per cubic foot up to about 130 pounds per cubic foot, the latter higher weight mud for example incorporating barite or barites. Thus, such barrier muds can have densities substantially greater than that of the seeping water and as high as two times the density (64 pounds per cubic foot of water) to more effectively block water migration. Bentonite muds as disclosed herein also have lubricity, enabling or facilitating penetration into water sands.

I claim:
1. The method of controlling subterranean flow of contaminants draining from a zone of contaminant concentration, that includes
   (a) determining the locus of flow of contaminants in a porous underground formation,
   (b) drilling boreholes in the underground formation at selected locations about said zone of contaminant concentration,
   (c) setting casing in the boreholes and cementing the casing in place,
   (d) then forming through openings sidewardly through the casings at selected elevations in the boreholes, and in relation to said locus of contaminant flow,
   (e) injecting into the formation via said through openings a substance that creates a barrier in the formation to said flow, to thereby establish a controlled height barrier to block said flow,
   (f) said (a) step including drilling at least one test hole in the formation to a region or regions toward which contaminant flow is suspected, and testing the composition of the formation via said test hole or holes,
   (g) said (b) and (c) steps including locating said boreholes containing said casing further from said zone than said test hole and drilling the boreholes deeper than contmination in the test hole.
2. The method of claim 1 wherein said (e) step injecting includes pumping said substance in flowable form and under pressure downwardly in the casing to a depth at which it flows through said selected elevation through openings and penetrates the underground formation.
3. The method of one of claims 1 and 2, wherein said substance comprises an expansible clay-like material or equivalent thereof, that enters and tends to plug flow passages in the formation.
4. The method of claim 2 wherein said substance comprises bentonite, in aqueous slurry.
5. The method of claim 1 including
   (c) maintaining an aqueous fluid pond proximate the earth's surface to define said zone.
6. The method of claim 5 including controllably flowing contaminated water into said pond, and allowing solids in said water to settle to the bottom of said pond.
7. The method of claim 6 including periodically removing the said settled solids from the pond bottom, and storing the removed solids, whereby the concentration of contaminants draining from the pond is correspondingly reduced.
8. The method of claim 7 including processing said solids to remove mineral concentrates.
9. The method of claim 8 wherein said concentrates include selenium and salts thereof.
10. The method of claim 7 wherein said periodic removal includes operating a dredge in the pond.
11. The method of claim 1 wherein said contaminates are selected from the group consisting of selenium, arsenic, boron, cadmium, chromium, copper, mercury, molybdenum, nickel, silver, zinc, and salts thereof.

12. Apparatus for controlling sub-terranean flow of contaminants draining or seeping into the earth from a zone of contaminant concentration, comprising
  (a) first means for determining the locus of flow of contaminants in a porous underground formation, and
  (b) second means for injecting into the formation a substance that creates a barrier in the formation to said flow, to thereby block said flow,
  (c) said second means including multiple boreholes in the formation, and spaced about said zone at selected locations, casings set in said boreholes, multiple through openings extending sidewardly through walls defined by the casings and at selected elevations in the boreholes, said elevations being laterally of elevations of the contaminant flow,
  (d) and said second means also including a source of said substance in mud form, and pump means pumping said substance into said casings in the boreholes, under pressure, effecting its flow into the formation at elevations determined by the through openings in the casings, establishing a controlled height barrier of said substance, and including said barrier,
  (e) and including said zone which is defined by a settling pond for contaminated water and which receives inflow of contaminants in water, and means removing settled contaminants from the bottom of the pond at a rate in relation to said inflow that contamination by escape of contaminants via subterranean flow, beyond the barrier, is substantially stabilized.

13. The apparatus of claim 12 wherein said first means includes at least one test well in the formation, and means to test water seeping into said test hole.

14. The apparatus of claim 12 wherein said substance comprises an expansible clay, or equivalent thereof.

15. The apparatus of claim 12 wherein said zone is defined by a settling pond for contaminated water, and including said barrier formed by said substance injected via said injection wells.

16. The apparatus of claim 12 wherein said last named means comprise a dredge.

17. The apparatus of claim 12 including means for treating the removed solids to extract heavy elements and salts.

18. The method of controlling the subterranean flow of contaminants in water draining from a pond or reservoir, the pond or reservoir also receiving inflow of contaminants, that includes
  (a) removing settled contaminants at the bottom of the reservoir, and
  (b) injecting into the subterranean formation a substance that creates a barrier in the formation to said subterranean flow, to thereby block said flow,
  (c) said contaminant removal being carried out at a rate in relation to said inflow that contamination by escape of contaminants via subterranean flow, beyond the barrier, is substantially stabilized.

19. The method of claim 18 wherein said (b) step includes drilling at least one hole in the formation, said (b) step injection being carried out via said hole or holes.

20. The method of claim 19 including setting casing in said hole, cementing the casing in place, said (b) step injecting including pumping said substance in flowable form and under pressure downwardly in the casing to a depth at which it penetrates the underground formation.

* * * * *